(12) United States Patent
Chang

(10) Patent No.: US 7,476,991 B2
(45) Date of Patent: Jan. 13, 2009

(54) LINEAR ELECTROMAGNETIC DRIVING MODULE AND LINEAR ELECTROMAGNETIC DRIVING DEVICE

(75) Inventor: Ching-Wen Chang, Kaohsiung Hsien (TW)

(73) Assignee: Elek Engine Corporation, Palo Alto, CA (US)

( * ) Notice: Subject to any disclaimer, the term of this patent is extended or adjusted under 35 U.S.C. 154(b) by 73 days.

(21) Appl. No.: 11/790,719

(22) Filed: Apr. 27, 2007

(65) Prior Publication Data

US 2008/0265687 A1    Oct. 30, 2008

(51) Int. Cl.
    *H02K 33/16* (2006.01)
(52) U.S. Cl. .............................. 310/24; 310/12; 310/34; 180/65.1
(58) Field of Classification Search .................... 310/24, 310/23, 34, 35, 20, 12, 15; 180/65.1
    See application file for complete search history.

(56) References Cited

U.S. PATENT DOCUMENTS

| | | | | |
|---|---|---|---|---|
| 3,967,146 A | * | 6/1976 | Howard | 310/80 |
| 4,359,673 A | * | 11/1982 | Bross et al. | 318/38 |
| 5,012,147 A | * | 4/1991 | Bertram et al. | 310/80 |
| 5,389,845 A | * | 2/1995 | Brimhall | 310/26 |
| 5,448,116 A | * | 9/1995 | Weiss et al. | 310/24 |
| 2006/0071561 A1 | * | 4/2006 | Chiu et al. | 310/20 |
| 2007/0148016 A1 | * | 6/2007 | Crawford et al. | 417/415 |

* cited by examiner

*Primary Examiner*—Michael C Zarroli
(74) *Attorney, Agent, or Firm*—Bacon & Thomas PLLC

(57) ABSTRACT

A linear electromagnetic driving device composed of multiple linear electromagnetic driving modules. A linear electromagnetic driving module has a base, an electromagnetic driving assembly, a crankshaft assembly and a bumper assembly. The electromagnetic driving assembly has a housing with coil and a linear magnetic shaft capable of moving linearly in the housing. The crankshaft assembly is mounted on the base, is connected to the linear magnetic shaft through crank arm and has two crank disks with pivot output shafts mounted rotatably on the base. The electromagnetic induced power output of each driving module is controlled and coordinated electronically through a sensor assembly on the driving device to maximize the energy efficiency.

8 Claims, 7 Drawing Sheets

LINEAR ELECTROMAGNETIC DRIVING MODULE AND LINEAR ELECTROMAGNETIC DRIVING DEVICE

BACKGROUND OF THE INVENTION

1. Field of the Invention

The present invention relates to a driving device, particularly to a linear electromagnetic driving device composed of multiple linear electromagnetic driving modules structured to mimic the conventional combustion engine. The electromagnetic induced power (torque) output of each driving module is controlled and coordinated electronically by a specially designed circuitry to maximize the energy efficiency.

2. Description of Related Art

A conventional electric motor comprises a casing, a stator and a rotor in an annular structure. The power output of a conventional electric motor is proportional to the size of the rotor and corresponding stator structure. Such structure requires high starting current to overcome the heavy rotor inertia and must attain a predetermined rotational speed to provide power out put to prevent stalling. To bear the high starting current, the motor needs a costly Y-A current-limiting starting apparatus to be integrated in the motor. The current-limiting starting apparatus usually consists of thick cable, large activator and voltage-dropping resistor, adding more weight and taking up considerable space that drives up the cost for assemble and maintenance. Hence, Electric or Hybrid automobiles using these conventional electromagnetic motors to replace or in addition to the combustion engine suffer the high starting current and bulky space that contributes to low energy efficiency and high cost of assembly and maintenance.

To overcome these shortcomings, the present invention provides a linear electromagnetic driving device to mitigate or obviate the aforementioned problems.

SUMMARY OF THE INVENTION

The main objective of the invention is to provide a linear electromagnetic driving device composed of multiple linear electromagnetic driving modules structured to mimic the conventional combustion engine. The power (torque) out put of the linear electromagnetic driving modules is controlled electronically by specially designed circuitry to maximize the energy efficiency.

A linear electromagnetic driving module in accordance with the present invention comprises a base, an electromagnetic driving assembly, a crankshaft assembly, and a bumper assembly. The electromagnetic driving module is mounted on the base and has a housing, a coil mounted in the housing and a linear magnetic shaft made of magnetic material and capable of moving linearly in the housing. The crankshaft assembly comprises two crank disks, a crank arm, an eccentric pivot pin, and a pivot output shaft on each crank disk. The crankshaft assembly is mounted on the base and is connected to the linear magnetic shaft through the crank arm on the eccentric pivot pin of the crank disks. The bumper assembly is mounted on the base and has a mounting crossbar, an abutment crossbar, a torsion spring, two rods, and two compression springs to absorb vibration or torsion.

Other objectives, advantages and novel features of the invention will become more apparent from the following detailed descriptions when taken in conjunction with the accompanying drawings.

DETAILED DESCRIPTION OF THE PREFERRED EMBODIMENT

Figure 1:
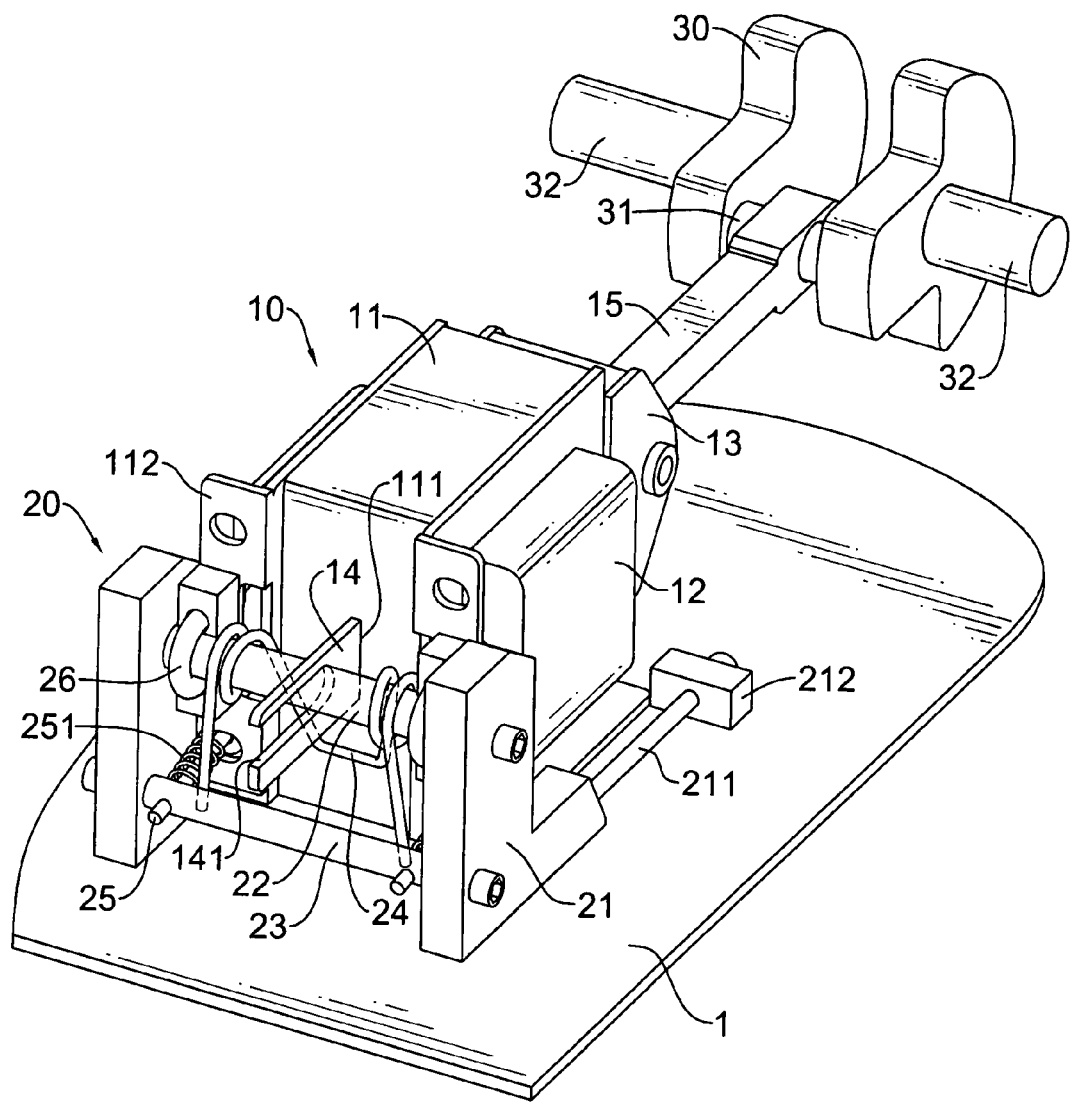
FIG. 1 is a perspective view of a linear electromagnetic driving module in accordance with the present invention.
Figure 2:
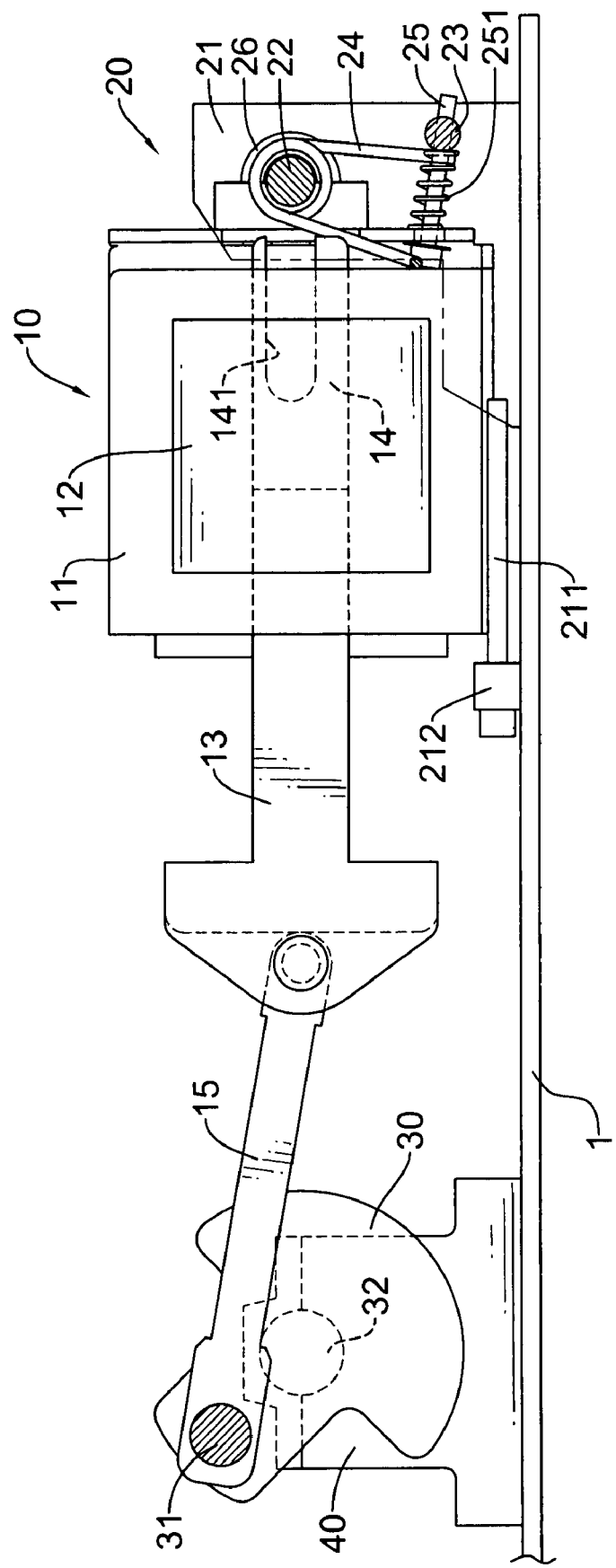
FIG. 2 is a side view in partial section of the linear electromagnetic driving module in FIG. 1 with the linear magnetic shaft at fully extended position.
Figure 3:
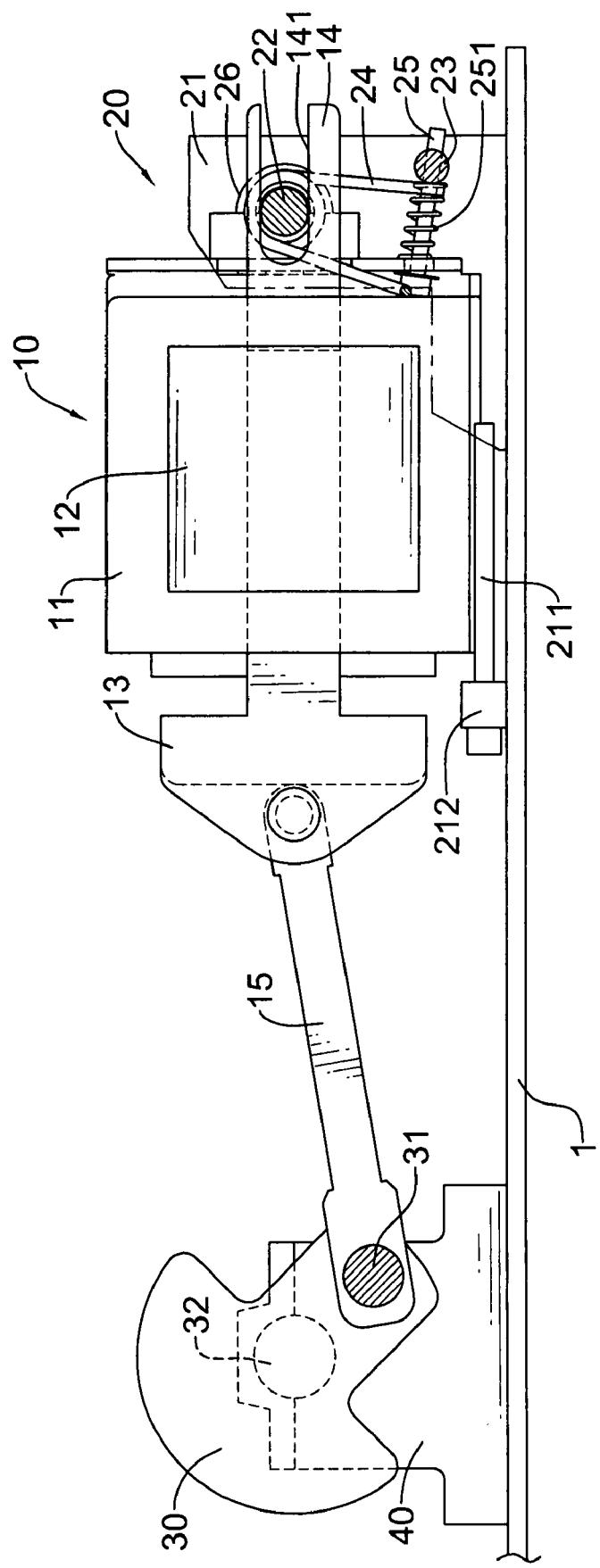
FIG. 3 is an operational side view in partial section of the linear electromagnetic driving module in FIG. 2 with the linear magnetic shaft at a fully retracted position.
Figure 4:
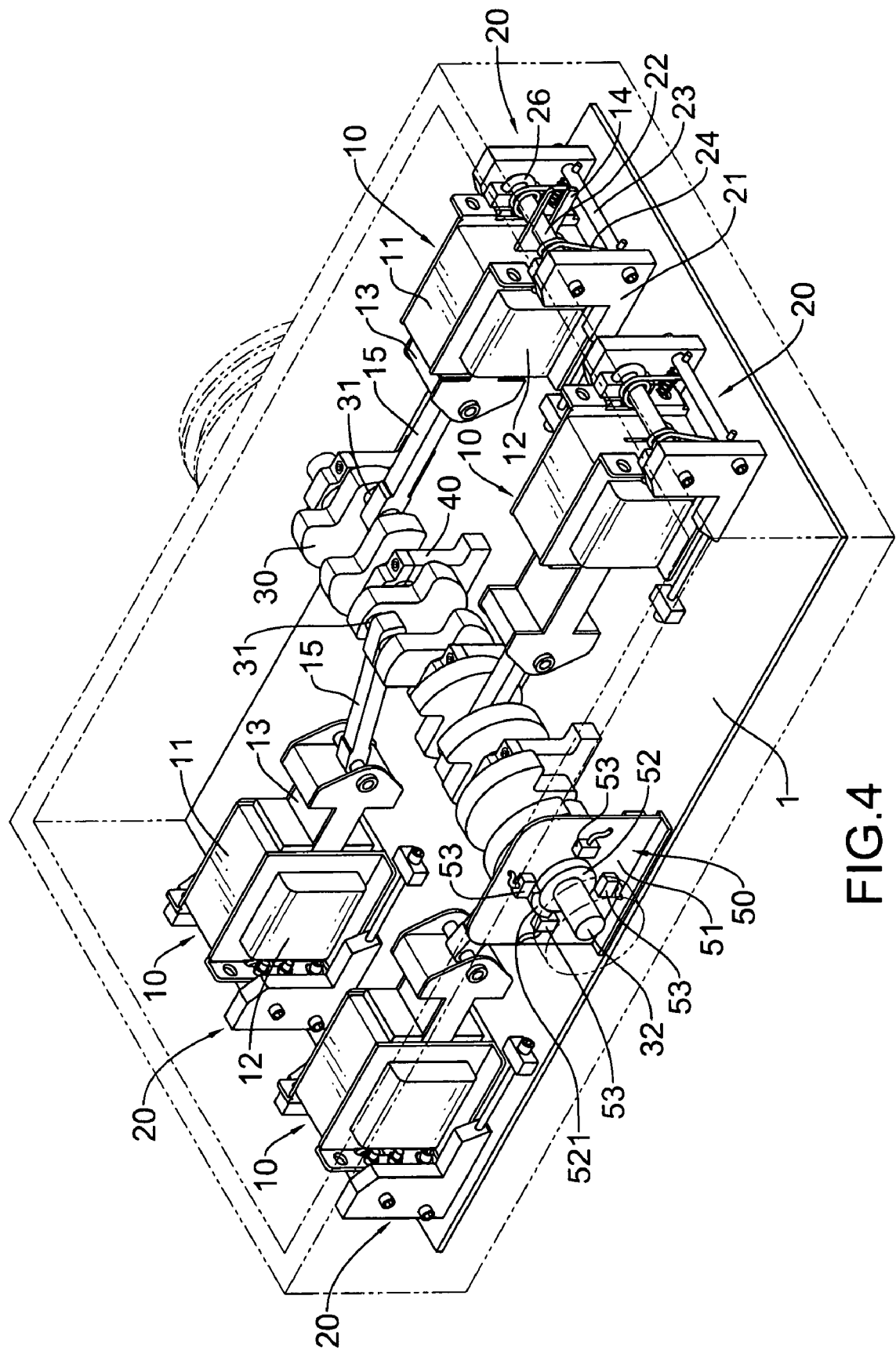
FIG. 4 is a perspective view of a linear electromagnetic driving device in accordance with the present invention comprising four linear electromagnetic driving modules as depicted in FIG. 1.

With reference to FIGS. 1-4, a linear electromagnetic driving module in accordance with the present invention comprises a base (1), an electromagnetic driving assembly in a middle, a crankshaft assembly at a front and a bumper assembly (20) at a rear.

The base (1) has two pivot brackets (40), and two bumper support brackets (21) to anchor each crankshaft assembly and corresponding linear driving module respectively.

The pivot brackets (40) are mounted on the base (1). The L-shaped bumper support brackets (21) are connected transversely with a mounting cross bar (22) and are reinforced by an abutment crossbar (23) are mounted on the base (1) and each bumper support bracket (21) has a front end, a mounting block (212) and a reinforcing bar (211). The mounting block (212) is mounted on the base (1). The reinforcing bar (211) is mounted between the front end of the bumper support bracket (21) and the mounting block (212). The mounting block (212) and reinforcing bar (211) improve the strength of the bumper support bracket (21) and prevent the bumper support bracket (21) from separating from the base (1).

The electromagnetic driving assembly (10) is located on the base (1) behind the crankshaft assembly and has a housing (11), a coil (12) and a linear magnetic shaft (13).

The housing (11) is mounted on the base (1) in front of the bumper support brackets (21) connected pivotally to the mounting crossbar (22) on the bumper support bracket (21) and has a front, a rear, two opposite sides, and a cavity as rail channel. Each side of the housing has a housing bracket projection (112) extending transversely outward from and perpendicular to the side of the housing (11) and a collar (26). The collars (26) are mounted respectively through slots in the housing bracket projections (112) around the mounting crossbar (22) of the bumper assembly on both sides of the housing (11). The lengthwise cavity is defined in the housing (11) to host the rail channel snugly for the movement of the linear magnetic shaft (13). The rail channel is defined longitudinally through the housing (11) overlapping the cavity and has a front opening and a rear opening (111).

The coil (12) is annular, is mounted in the cavity around the rail channel and can generate a forward and/or backward magnetic force longitudinally when electrified.

The linear magnetic shaft (13) is made of magnetic material (momentary or permanent magnet), is mounted in the front opening of the rail channel, is capable of moving linearly in the rail channel by the magnetic force of the electrified coil (12), is connected to the crankshaft assembly. The linear magnetic shaft (13) has a front end, a rear end, and a slide plate (14), which is mounted on the rear end and extending through the rear opening (111) of the rail channel. The slide plate (14) is fork shaped and has a recess (141). The fork shaped slide plate (14) guides the linear movement of the linear magnetic shaft (13) and is allowed to slide through the rear opening (111) of the housing during operation The crankshaft assembly is mounted on the base (1), is connected to the linear magnetic shaft (13), and has a pair of crank disks (30), a pair of pivot output shafts (32), a crank arm (15) and an eccentric pivot pin (31).

The crank disks (30) are mounted between the pivot brackets (40). Each crank disk (30) is mounted rotatably on one of the pivot brackets (40) and has an eccentric pivot hole. The eccentric pivot hole is defined in the crank disk (30).

The pivot output shafts (32) are attached outwardly perpendicular to the crank disks (30), and are rotatably mounted respectively through the pivot brackets (40) on both sides of the crank disks (30). The pivot output shafts (32) on the crank disks may be connected to a power (torque) output gear mechanism, which can be fitted to drive a motorized vehicle when the coil (12) is electrified to drive the linear magnetic shafts (13) in a controlled sequential order.

The crank arm (15) connects between the crank disks (30) and the linear magnetic shaft (13) and has a front end and a rear end. The front end of the crank arm (15) is mounted pivotally on the eccentric pivot pin (31) between the crank disks (30). The rear end of the crank arm (15) is mounted pivotally on the front end of the linear magnetic shaft (13) by a pivot pin.

The eccentric pivot pin (31) extends rotatably through the front end of the crank arm (15) and is mounted in the eccentric pivot holes in the crank disks (30).

When the coil (12) is electrified, the linear magnetic shaft (13) moves back and forth in the rail channel to push the crank arm (15) and rotates the crank disks (30) and the pivot output shafts (32) of the crankshaft assembly.

The bumper assembly (20) is mounted on the base (1) and has the mounting crossbar (22), the abutment crossbar (23), a torsion spring (24), two rods (25), and two compression springs (251).

The mounting crossbar (22) is mounted between the bumper support brackets (21). The abutment crossbar (23) is mounted between the bumper support brackets (21) under the mounting crossbar (22).

The torsion spring (24) is mounted around the mounting crossbar (22) between the rear of the housing (11) and the abutment crossbar (23), presses against the rear of the housing (11) and the abutment crossbar (23) and has an intermediate section and two ends. The intermediate section presses against the rear of the housing (11). The ends of the torsion spring (24) press against the abutment crossbar (23).

The rods (25) correspond respectively to the housing bracket projections (112) on the housing (11). Each rod (25) is mounted through a corresponding housing bracket projection (112) on the housing (11) and is mounted securely on the abutment crossbar (23).

The compression springs (251) are mounted around the rods (25) correspond respectively to the housing bracket projections (112) on the housing (11). Each compression spring (251) presses against the corresponding housing bracket projection (112) and the abutment crossbar (23).

With the torsion spring (24) and the compression springs (251) the bumper assembly cushion the potential vibration or torsion caused by the reciprocating movement of the magnetic shaft to prevent the housing (11) from breaking loose or disengaging from the base (1).

Figure 5:
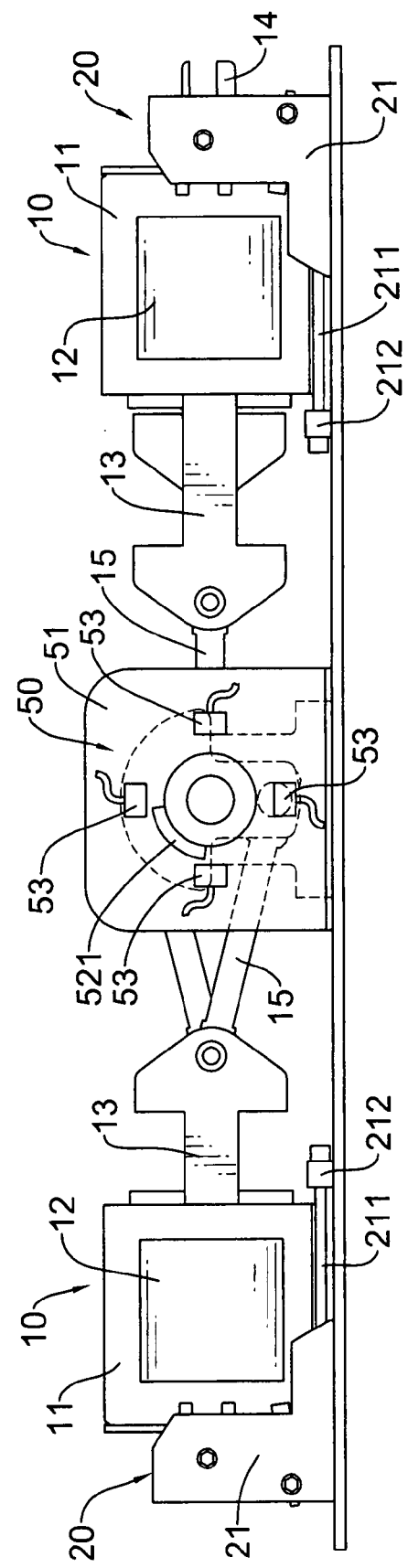
FIG. 5 is a side view of the linear electromagnetic driving device in FIG. 4 with the sensor assembly located at the center.
Figure 6:
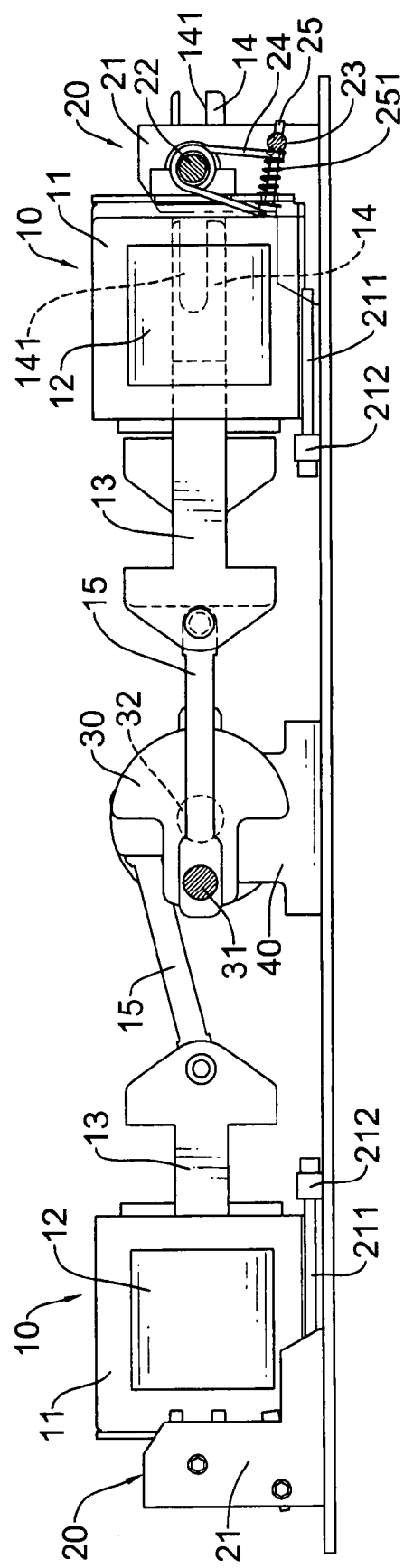
FIG. 6 is a side view in partial section of the linear electromagnetic driving device in FIG. 5 without the sensor assembly.
Figure 7:
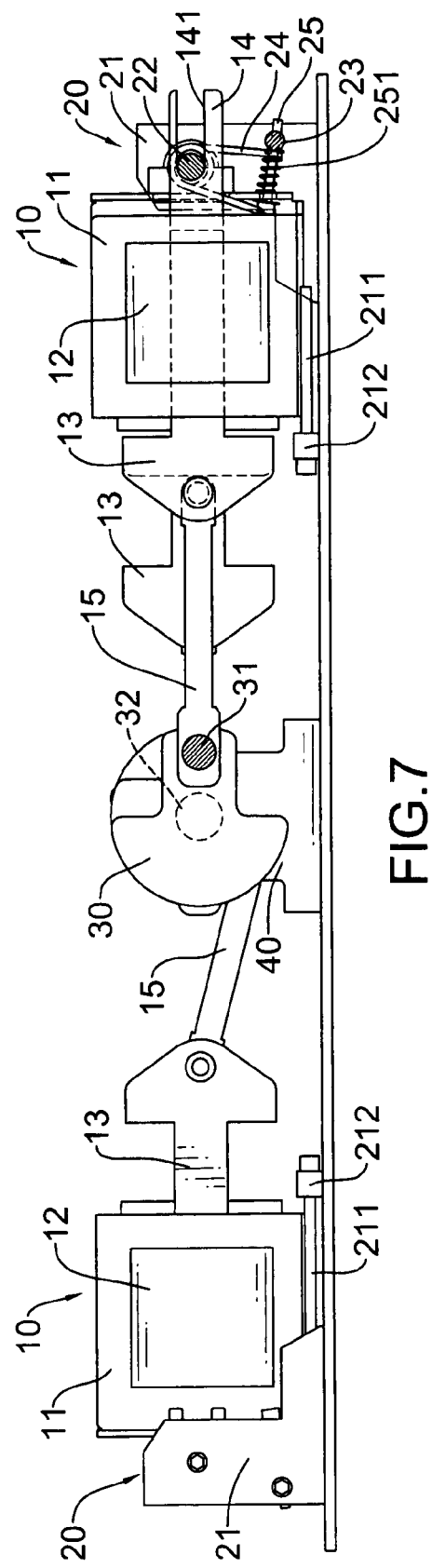
FIG. 7 is an operational side view in partial section of the linear electromagnetic driving device in FIG. 6 with the linear magnetic shafts moving respectively in the rail channels.

With reference to FIGS. 4-7, a linear electromagnetic driving device in accordance with the present invention comprises four aforementioned linear electromagnetic driving modules mounted on the base (1) and a sensor assembly (50) also mounted on the base (1) of a rectangular alloy casing.

All of the bases (1) of the linear electromagnetic driving modules and the sensor assembly are formed integrally to define a seat.

The four linear electromagnetic driving modules are evenly divided into set 1 and set 2. These two sets of linear electromagnetic driving modules are arranged to face each other in staggered positions on the seat in the set 1 then the set 2 alternate order, and linked pivotally with the pivot output shafts (32), which are shared between the adjacent linear electromagnetic driving modules and extend out on the outermost sets pivotally as power output crank shafts. All pivot output shafts (32) are pivotally supported and secured on the seat with the pivot brackets (40) such that all pairs of the crank disks (30) on the linear electromagnetic driving modules are capable of rotating pivotally and synchronously.

The sensor assembly is mounted on the seat adjacent to one of the crank disks (30), and has a mounting bracket (51), a ring (52) with protrusion (521) and four sensors (53).

The mounting bracket (51) is mounted on the seat and has a pivot hole, through which the pivot output shaft (32) of the crank disk (30) extends out pivotally.

The ring (52) is mounted securely around the pivot output shaft (32) of the outermost crank disk (30) and has a contact protrusion (521). The contact protrusion (521) protrudes radially from the ring (52) to make a full contact with one of the sensors (53) when the linear magnetic shaft (13) of the corresponding linear electromagnetic driving module is at its fully extended (or retracted) position.

The sensors (53) are mounted on the mounting bracket (53) radially from the pivot hole, correspond respectively to and are electrically connected respectively to the coils (12) of the set 1 and set 2 of the linear electromagnetic driving modules, are arranged in a circle around the ring (52) and are arranged at four 90° angular intervals (quadrants). Each sensor (53) selectively acts to sense the contact protrusion (521) to electrify a corresponding coil (12) and activate the linear electromagnetic driving module in which the corresponding coil (12) are mounted.

When one of the four linear electromagnetic driving modules is activated to rotate the pivot output shafts (32) a quadrant (90°), the remaining linear electromagnetic driving modules are at standby condition with no current flow through. The electromagnetic driving device does not require a high starting current and can provide instantaneous power output without reaching a pre-determined rotation speed like the conventional electric motor. Much less electric energy is wasted in frequent start and stop operation. The multiple electromagnetic module design requires only a fraction of the electric current to generate an equivalent power output to a conventional electric magnetic motor. Therefore, the energy efficiency of the electromagnetic driving device is high. Furthermore, the compact and modular design affords much lower costs in assembly, maintenance, and repair.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A linear electromagnetic driving module comprising:
    a base having two pivot brackets mounted on the base;
    an electromagnetic driving assembly mounted on the base behind the pivot bracket and having
        a housing mounted on the base and having a front, a rear, two sides, a cavity defined in the housing and a rail channel defined through the housing and having a front opening and a rear opening;
        a coil mounted in the cavity around the rail channel; and
        a linear magnetic shaft made of magnetic material mounted at the front opening of the rail channel, being capable of moving linearly in the rail channel and having, a rear end and a slide plate mounted on the rear end and extending through a rear opening of the rail channel; and
    a crankshaft assembly mounted on the base, connected to the linear magnetic shaft and having
        a pair of crank disks being mounted between the two pivot brackets, each crank disk mounted rotatably on one of the pivot brackets, and each crank disk having an eccentric pivot hole;
        a pair of pivot output shafts attached respectively to the crank disks, being rotatably mounted respectively through the pivot brackets;
        a crank arm connecting between the crank disk and the linear magnetic shaft and having a front end mounted on the eccentric pivot pin of the crank disks and a rear end mounted pivotally on the front end of the linear magnetic shaft; and
        an eccentric pivot pin being mounted in the eccentric pivot holes on the crank disks, extending rotatably through the front end of the crank arm.

2. The linear electromagnetic driving module as claimed in claim 1, wherein:
    the base further has
        two bumper support brackets mounted on the base and each bumper support bracket having a front end; and
        a mounting crossbar mounted between the bumper support brackets;
    the housing is in front of the bumper support brackets, is connected pivotally to the mounting crossbar on the bumper support bracket and each side of the housing further has
        a housing bracket projection extending transversely outward from and perpendicular to the side; and
        a collar mounted on the housing bracket projection around the mounting crossbar;
    a bumper assembly mounted on the base and has
        an abutment crossbar mounted between the bumper support brackets; and
        a torsion spring mounted around the mounting crossbar between the rear of the housing and the abutment crossbar and pressing against the rear of the housing and the abutment crossbar.

3. The linear electromagnetic driving module as claimed in claim 2, wherein the bumper assembly further has
    two rods corresponding respectively to the housing bracket projections on the housing and each rod mounted through a corresponding housing bracket projection on the housing and mounted securely on the abutment crossbar; and
    two compression springs corresponding respectively to the housing bracket projections on the housing, mounted respectively around the rods and each compression spring pressing against a corresponding housing bracket projection on the housing and the abutment crossbar.

4. The linear electromagnetic driving module as claimed in claim 3, wherein each bumper support bracket further has a mounting block mounted on the base and a reinforcing bar mounted between the front end of the bumper support bracket and the mounting block.

5. The linear electromagnetic driving module as claimed in claim 4, wherein the linear magnetic shaft is made of permanent magnet.

6. The linear electromagnetic driving module as claimed in claim 4, wherein the linear magnetic shaft is made of momentary magnet.

7. A linear electromagnetic driving device comprising of four linear electromagnetic driving modules divided evenly into two sets being set 1 and set 2, and each linear electromagnetic driving module having
    a base having;
    an electromagnetic driving assembly mounted on the base and having
        a housing mounted on the base and having a front, a rear, two sides, a cavity defined in the housing and a rail channel defined through the housing and having a front opening and a rear opening;
        a coil mounted in the cavity around the rail channel; and
        a linear magnetic shaft made of magnetic material, mounted at the front opening of the rail channel, being capable of moving linearly in the rail channel and having a rear end and a slide plate mounted on the rear end extending through rear opening of the rail channel; and
    a crankshaft assembly mounted on the base, connected to the linear magnetic shaft and having
        a pair of crank disks mounted rotatably on the base and each crank disk having an eccentric pivot hole;
        a pair of pivot output shafts attached respectively to the crank disks and mounted rotatably on the base;
        a crank arm connecting pivotally between the crank disk and the linear magnetic shaft and having a front end mounted on the eccentric pivot pin between the crank disks and a rear end mounted pivotally on the front end of the linear magnetic shaft; and
    an eccentric pivot pin extending rotatably through the front end of the crank arm and mounted in the eccentric pivot hole holes in the crank disks; wherein
    all of the bases of the linear electromagnetic driving modules are formed integrally to define a seat; wherein:
    the set 1 and set 2 of the four linear electromagnetic driving modules are arranged to face each other in staggered positions on the seat, and linked pivotally with the pivot output shafts, which are shared between the adjacent linear electromagnetic driving modules and extend out on the outermost sets pivotally as power output crank shafts;

all pivot output shafts are pivotally supported and secured on the seat with pivot brackets such that all pairs of the crank disks on each linear electromagnetic driving modules are capable of rotating pivotally and synchronously;

a sensor assembly is mounted on the seat adjacent to one of the crank disks and has a mounting bracket, a ring with protrusion and four sensors;

the mounting bracket is mounted on the seat and has a pivot hole through which the pivot output shaft of the crank disk extends out pivotally;

the ring is mounted securely around the pivot output shaft of the outermost crank disk and has a contact protrusion protruding radially from the ring to make a full contact with one of the sensors when the linear magnetic shaft of the corresponding linear electromagnetic driving module is at its fully extended or retracted position;

the sensors are mounted on the mounting bracket radially from the pivot hole, correspond respectively to and are electrically connected respectively to the coils of set 1 and set 2 of the four linear electromagnetic driving modules, are arranged in a circle around the ring and are arranged at four 90° angular intervals, each sensor selectively acts to sense the contact protrusion to electrify a corresponding coil and activate the linear electromagnetic driving module in which the corresponding coil are mounted.

8. The electromagnetic driving device as claimed in claim 7, wherein the linear magnetic shaft is made of permanent magnet.

* * * * *